Sept. 21, 1926.
E. A. SPERRY
1,600,569
METHOD OF AND MEANS FOR BALANCING MASSES
Filed Oct. 14, 1921   2 Sheets-Sheet 1
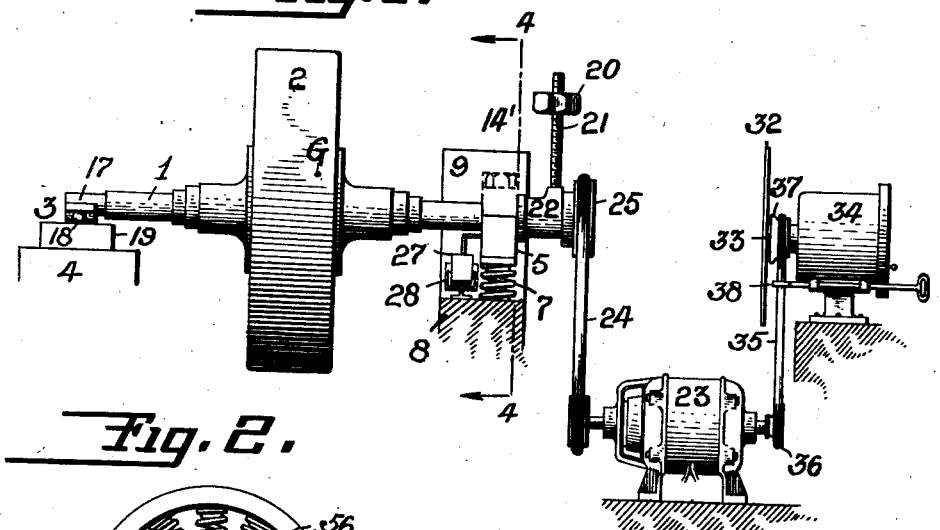
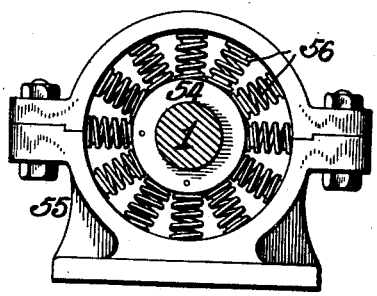
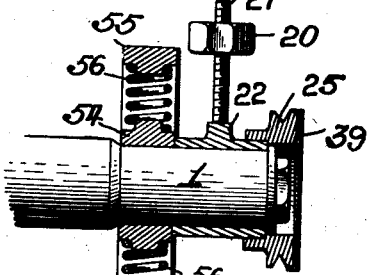
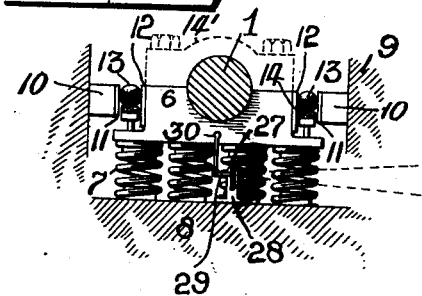
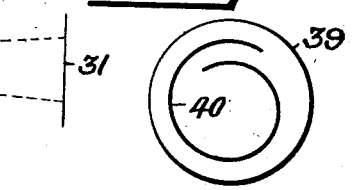
Inventor
ELMER A. SPERRY.
By his Attorney
Herbert H. Thompson Sept. 21, 1926.
E. A. SPERRY
1,600,569
METHOD OF AND MEANS FOR BALANCING MASSES
Filed Oct. 14, 1921  2 Sheets-Sheet 2
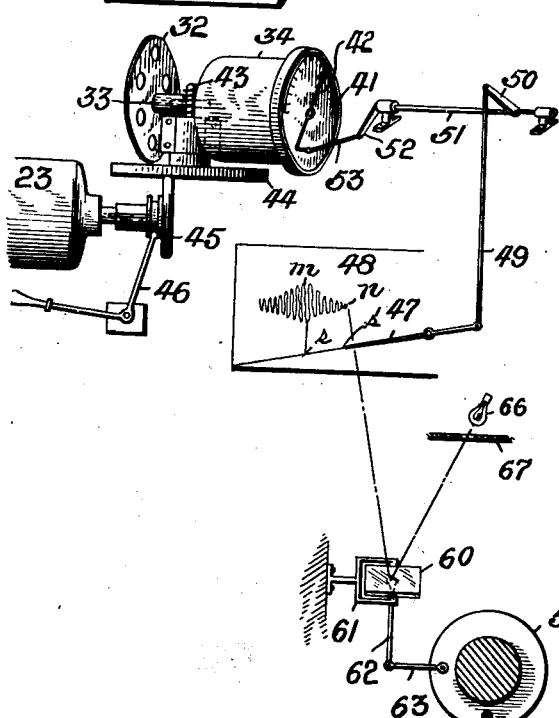
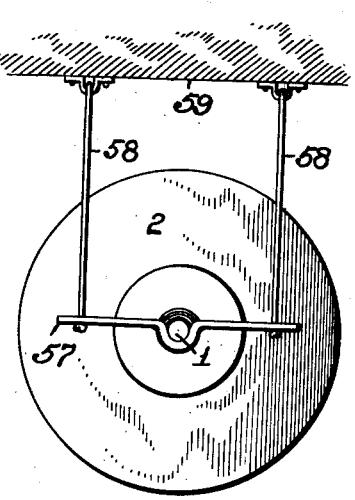
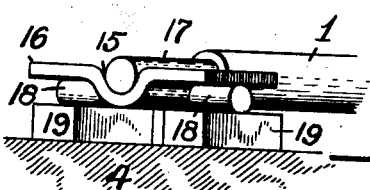
Inventor
ELMER A. SPERRY
By his Attorney
Herbert H. Thompson

Patented Sept. 21, 1926.

1,600,569

UNITED STATES PATENT OFFICE.

ELMER A. SPERRY, OF BROOKLYN, NEW YORK.

METHOD OF AND MEANS FOR BALANCING MASSES.

Application filed October 14, 1921. Serial No. 507,592.

With constantly increasing frequency it is becoming necessary to secure both the static and dynamic balance with a very high degree of accuracy of large and heavy rotors for turbines and gyroscopes, especially such as used in stabilizing ships. This has been attempted and sometimes effected by rotating the object and marking or otherwise ascertaining the locus and magnitude of the out-of-balance factor. With these large masses, however, an extraordinarily large amount of time is consumed in getting them both into and out of the state of rotation, owing to the enormous amount of energy required to be gradually imparted to effect this rotation, at sufficient speed to reach their "critical" speed or its sub-harmonic, to get into which is necessary for best results. Many times efforts to save time by applying powerful brakes to stop the heavy masses quickly have been tried, but the stored energy is so great as to heat the braked surfaces quickly and distort the structure being balanced, which when cooled, is found out-of-balance.

Again, the balancing machines on which the heavy rotors are tested are extremely expensive and it is almost impossible to make them sufficiently sensitive to secure as perfect balancing as can be secured by my invention.

The object of the present invention is to improve this and cheapen the process by eliminating the necessity of rotating even at slow speeds, the object to be balanced. The method and apparatus apply to solving a number of important problems other than balancing, for instance, to ascertain the homogeneity of bodies, also determination of the center of gravity of an irregular body or the location of a cavity in any shaped body, especially when the mass is too fragile to allow of spinning or of too low tenacity to resist the more or less heavy centrifugal strains. The location of the exact position of the center of gravity is often very useful as it reveals something of the internal structure. By its use I am enabled to balance a body with great exactitude both statically and dynamically.

Another object of the invention is to devise a method of quickly locating the center of gravity of a mass, with respect to its center of rotation. The process, method and apparatus involved in this method of locating the center of gravity of a mass or balancing a mass will now be described.

I first provide the body with projections or the equivalent, preferably symmetrically or diametrically disposed and in line, as in this arrangement an axis of reference may be established. These projections may be secured to the mass in any suitable manner. The mass is now afforded a yielding support and vibrated by extraneous means, first one end and then the other, and the results and the behavior observed and deductions made that locate the center of gravity or the heaviest or the lightest point with great exactitude both as to the distance away from the axis of reference, and also along the length of such axis, but what is equally important, of the exact magnitude plus or minus of the characteristic sought. This may be the final object and is practically all the problem, even if farther steps follow, such as rectifying or balancing, filling the cavity, or what not.

Other objects and advantages of my invention will become apparent as the description thereof is hereinafter developed.

Referring to the drawings wherein I have shown what I now consider to be the preferred forms of my invention:

Fig. 1 is a side elevation of certain apparatus which may be employed to carry out my improved balancing process.

Fig. 2 is a front elevation of one form of resilient supporting means for one end of the rotor shaft, the latter being shown in section.

Fig. 3 is a vertical sectional view through the supporting means of Fig. 3, the rotor shaft appearing in elevation.

Fig. 4 is a sectional view, taken on line 4—4 of Fig. 1, of another form of resilient mounting for one end of the rotor shaft.

Fig. 5 is a view of a detail.

Fig. 6 is a diagrammatic view illustrating further the mode of operation of my invention.

Fig. 7 is a view in end elevation of one form of support for the end of the rotor shaft opposite to the resilient supporting means.

Fig. 8 is a view of another form of support for the last mentioned end of the rotor shaft.

Fig. 9 is a view showing how my invention may be applied to the balancing of an irregular mass.

In Fig. 1, the mass to be balanced is a heavy wheel or gyroscope rotor 2, provided with a shaft 1, about the axis of which the rotor is to be balanced. Said shaft is supported at one end in a bearing 3 on a support 4, and at its other end in a special resilient bearing 5. The latter is shown in detail in Fig. 4 and comprises a block 6 having a seat for receiving shaft 1 and resting upon a plurality of springs 7 which are interposed between the lower surface of said block and a suitable supporting base 8. Walls 9 project upwardly from base 8 on opposite sides of block 6 and are provided with inwardly projecting extensions 10. The latter may be provided with chilled steel plates 11 between which and corresponding plates 12, on opposite sides of block 6, are positioned anti-friction members such as balls 13. Said balls rest upon pieces of felt, 14, which may be impregnated with lubricant and which are carried by block 6 as shown. With this construction it is readily apparent that lateral movement of block 6 and shaft 1 is prevented and that at the same time said shaft and block are free to move up and down. If desired, a cap 14' may be placed over shaft 1 and clamped to block 6, although such cap is not essential, since springs 7 maintain block 6 in engagement with shaft 1, when the latter moves upwardly.

One form which bearing 3 may assume is shown in Figs. 1 and 8, wherein the end 17 of shaft 1 opposite from bearing 5 is received within a depressed portion 15 of a plate 16 which in turn is shown mounted on roller bearings 18 on a bearing plate 19 supported on base 4.

If now, with the shaft and rotor mounted as above described, a weight be rotatably mounted on shaft 1 and be rotated therearound, vertical vibrations of the shaft will result, due to the variation of the vertical component of the centrifugal force of the rotating weight. From the character of these vibrations the balancing of the rotor may be readily accomplished. At 20 I have shown a weight carried by a rod 21 which in turn is rotatable with a collar 22 mounted on shaft 1 for rotation with respect thereto. Collar 22 may be rotated by a motor 23, through the medium of a belt 24 driven by the motor and passing over a pulley 25 secured to said collar. The rod 21 may be threaded if desired so that weight 20 may be adjusted thereon.

The character of the vibrations of the rotor and shaft 1 will be affected by the position of the center of gravity of the rotor and by the speed of rotation of the weight 20. If said center of gravity is in the axis of rotation of the rotor the vibrations occurring will not vary even though the angular position of said rotor about said axis be changed. If, however, said center of gravity is not in the axis of rotation of the rotor, i. e., if the rotor is not accurately balanced the vibrations which occur when the rotor and shaft are in one position will differ from those occurring when said rotor and shaft are turned to another position about the axis of rotation. For example, suppose that the center of gravity of the rotor is at G, Fig. 1. When said center of gravity is in a vertical plane passing thru the axis of rotation, the distance from a vertical line therethrough to the longitudinal axis of the bearing 3 is less than when said center of gravity is in a plane passing through the axis of rotation and at an angle to the vertical, and hence the unbalanced force exerted by the unbalanced mass about the end 17 of the shaft increases as the angle between a vertical plane and the radial plane containing the center of gravity increases. Said force becomes a maximum when the said center of gravity is in a horizontal radial plane. These variations in unbalanced forces cause corresponding variations in the vibrations of the rotor and shaft and hence by comparing the vibrations for different angular positions of the shaft and rotor the plane which passes through the axis of rotation of the rotor and contains the center of gravity may be determined. The radial plane in which weight must be added to or withdrawn from the rotor is thus found.

By my improved method, not only am I able to determine the plane in which the out of balance portion lies, but also, by varying the speed of rotation of the weight 20 and also its distance from the center of shaft 1, I am able to estimate by calculation the exact amount of weight that it is necessary to add or subtract to the rotor and its exact location. As is well known, every object which is however slightly out of balance has its critical speed or speeds, i. e., those speeds at which its vibration is a maximum. Likewise, when rotating the mass 20 about the shaft, a critical speed or speeds at which the vibration will be a maximum may be found for every angular position of rotor 2 desired and every radial position of weight 20 desired. These points of maximum and minimum vibration may be readily determined by the graphic methods hereinafter described and the speeds at which they occur recorded. With the data thus obtained, and knowing the moment of weight 2 and its support, sufficient data is at hand to calculate readily, either graphically or by means of the calculus, the exact location of the center of gravity of the rotor and how much should be added or subtracted and where, to secure a perfect balance.

In order to ascertain whether the center of gravity is nearer one face of the rotor than the other, shaft 1 may be turned end for end. The vibrations of the shaft 1 due to rotation of weight 20 are now observed and compared with those corresponding to the same angular position of the shaft and rotor before the shaft was turned end for end. If said vibrations are the same, the center of gravity lies in a transverse vertical plane equidistant from the faces of the rotor. If said center of gravity is nearer one face than the other, the torque exerted by the weight of the rotor about the end of the shaft that rests in bearing 3 will vary when the shaft is turned end for end, even though the angular position of the rotor about the axis of rotation be the same in each case. By comparing said vibrations the face of the rotor nearest the center of gravity may be readily determined. The radial plane of the center of gravity being known, and also the face of the rotor nearest the center of gravity, the side of the rotor and the radial plane thereof to which weight must be added or subtracted is known. By now adding or subtracting weight until the vibrations are the same for different angular positions of the rotor both before and after the shaft 1 is turned end for end, perfect balance of the rotor results.

My balancing method may thus be briefly summarized as follows: The rotor and shaft are first mounted for oscillation or vibration, as above described, and weight 20 is rotated about shaft 1, at variable speeds and under various adjustments. The vibrations of said shaft are then recorded by any suitable means such as will be described hereinafter. The rotor and shaft are then turned through a given angle about the axis of rotation, ten degrees for example, and the maximum and minimum vibrations resulting from the rotation of weight 20 again recorded, as well as the speeds producing the same. This turning of rotor and shaft to different angular positions about the axis of rotation and measuring the corresponding vibrations is continued until the radial plane containing and in fact, the exact location of the center of gravity is determined, as above explained. The rotor and shaft are now turned end for end and the vibrations again measured, the rotor being turned about its axis of rotation to a position corresponding to one of those in which its vibrations were previously measured. By comparing the vibrations of the rotor and shaft when turned end for end with those occurring for the same position of the shaft and rotor with respect to the axis of rotation before the shaft and rotor were turned end for end, the face of the rotor nearest the center of gravity may be found. Thus the radial plane of the center of gravity being known, and also the face of the rotor nearest said center of gravity, weight may accordingly be added or subtracted until the vibrations are the same for different angular positions of the rotor and shaft, both before and after the same are turned end for end. The rotor and shaft are then accurately balanced.

In order that the vibrations of the shaft 1 may be conveniently observed, I have devised means for obtaining a record of said vibration which means may be constructed substantially as follows. A mirror 27 is mounted in brackets 28 (Figs. 1 and 4) for movement about a horizontal axis and is connected by an arm 29 and link 30 to the bearing block 6 of the shaft so that as said shaft vibrates, the mirror 27 will be oscillated. If, now, a beam of light be directed upon said mirror, the reflected beam will be oscillated and if said beam is thrown upon a sensitized surface 31 which surface may be moved by clock work or other constant speed mechanism, as is well understood, a graphic record of the vibrations of the shaft 1 may be obtained. By varying the speed of rotation, a point of maximum and minimum vibration may be easily determined.

The speed of rotation of collar 22 and weight 20 may be measured from time to time by any suitable means such as a stroboscope, such as shown in my Patent No. 1,071,815, "apparatus for determining periodic motion", granted Sept. 2, 1913. As shown in Figs. 1 and 6, a perforated disk 32 is mounted on the shaft 33 of a tachometer 34 which may be driven in any suitable manner from motor 23. In Fig. 1 a belt 35 is shown connecting a cone pulley 36 on the motor shaft with a cone pulley 37 on shaft 33. Belt 35 may be shifted by any conventional means such as a forked lever indicated at 38, so that variable speeds of rotation of shaft 33 may be obtained without changing the motor speed. A disk 39, secured to collar 25, has a spiral 40 depicted thereon (Fig. 5), which spiral is observed through the perforated disk 32. If disk 32 is rotated at such a speed that the spiral 40 appears stationary when viewed thru said disk, and the tachometer scale 41 (Fig. 6) is calibrated in accordance with the speed of interruption of vision by disk 32, the speed of rotation of collar 22 will be indicated by pointer 42 in conjunction with said scale.

In Fig. 6 is shown an alternative form of means for obtaining variable speeds of rotation of shaft 33 without changing the motor speed. Shaft 33 is shown as driven by a worm 43 rotatable with a disk 44 which disk is engaged by a friction disk 45 driven by the motor. Friction disk 45 is slidably mounted on the motor shaft and may be shifted by lever 46 to engage disk 44 at different distances from the center thereof so that the speed of said disk 44 and hence of shaft 33, may be varied as desired.

A record of the speed of rotation of the weight 20 may be obtained by any suitable means, such as shown in Fig. 6. A marker 47 is pivoted intermediate its ends and cooperates with a movable surface 48. Said marker may be connected to pointer 42 by any of a variety of means. As shown, a link 49 connects said marker with a crank arm 50 of a rotatable rod 51, which rod is provided with another crank arm 52 connected with pointer 42 by a link 53, so that movement of said pointer results in corresponding movement of said marker.

In Figs. 2, 3 and 7 are shown supports for the shaft 1 which permit both vertical and horizontal vibrations of said shaft. As shown in Figs. 2 and 3, one end of the shaft may be received within a collar 54. Interposed between said collar and the inner circumference of a bearing 55 is a series of radial compression springs 56, said springs extending around the circumference of said collar, so that the shaft is resiliently supported for movement both vertically and horizontally. A support for the other end of the shaft is shown in Fig. 7, and may comprise a plate 57 which receives said end of the shaft and is suspended by ropes or other flexible members 58 from a support 59.

When the shaft is supported as shown in Figs. 2, 3 and 7, two mirrors at right angles to each other may be employed, one responsive to vertical vibrations of the shaft, and the other to horizontal vibrations thereof. Thus, in addition to mirror 27, a second mirror 60 is shown in Fig. 6 pivotally mounted in brackets 61 and connected to collar 54 by an arm 62 and link 63. An incandescent lamp 64 may be employed to throw a beam of light through an aperture in a screen 65 and upon the mirror 27, whence, said beam is reflected upon the movable surface 31. Similarly an incandescent lamp 66 and screen 67 may serve to direct a beam of light upon mirror 60.

The record of the speed of rotation of the weight 20 may be made, if desired, on the same movable surface as the record traced by the reflected beam from one of mirrors 27, 60. As shown in Fig. 6, the beam reflected by mirror 60 falls upon movable surface 48. The portion of said surface that receives the reflected beam is of light sensitive material, while the portion that cooperates with marker 47 may be of paper ordinarily employed for such purpose. The surface 31 is, of course, of suitable light sensitive material. This method gives the marked advantage of showing at once the speeds $s$ and $s'$ corresponding to the maximum $(m)$ and minimum $(n)$ vibrations of the apparatus.

My method and apparatus are applicable to the balancing of masses in general, regardless of the shape or use thereof. In Fig. 9, for example, an irregular mass 70 is shown which may be balanced in accordance with my process, by affixing to said mass supporting extensions or stems 71, 72. These stems correspond to shaft 1, and may be mounted in the same manner as said shaft so that my process may be applied thereto as hereinbefore described.

In accordance with the provisions of the patent statutes, I have herein described the principle of operation my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is;

1. The method of balancing a mass without rotating the same which comprises yieldingly supporting said mass, and rotating a second mass about an axis of the first mentioned mass and observing the vibrations of said axis.

2. The method of locating the center of gravity of a rotor or other mass with respect to an axis without rotating the same which consists in yieldingly supporting said mass, and in rotating a second mass at various speeds about said axis and observing the vibrations of said axis.

3. The method of balancing a mass which comprises yieldingly supporting said mass to be tested, rotating a second mass of known moment about an axis of the first mentioned mass while said first mass is stationary and observing the vibrations of said axis.

4. The method of locating the center of gravity of a rotor or other mass with respect to an axis while said rotor is stationary which consists in yieldingly supporting said rotor in rotating a second mass of known moment at various speeds about said axis and observing the vibrations of said axis.

5. The method of balancing a mass which comprises yieldingly supporting the mass to be tested, rotating a second mass about an axis of the first mentioned mass when the latter is in different angular positions, and obtaining a record of the vibrations of said axis for each of said positions.

6. The method of locating the center of gravity of a mass which comprises yieldingly supporting the mass to be tested, rotating a second mass at various speeds about an axis of the first mentioned mass when the latter is in different angular positions, and obtaining a record of the vibrations of said axis for each of said positions.

7. The method of balancing a mass which comprises resiliently supporting the mass to be tested, rotating a second mass of known moment about an axis of the first mentioned mass when the latter is in different angular positions, and obtaining a record of the vibrations of said axis for each of said positions.

8. The method of locating the center of gravity of a mass which comprises resiliently supporting the mass to be tested, rotating a second mass of known moment and at various speeds about an axis of the first mentioned mass when the latter is fixed in different angular positions, and obtaining a record of the vibrations of said axis for each of said positions.

9. The method of locating the center of gravity of a rotor or other mass with respect to an axis which comprises rotating a second mass about said axis at different speeds, turning the former to different positions about said axis and repeating said rotation at different speeds, obtaining a record of the vibrations of said axis for each of said different positions and speeds and comparing said records to locate the center of gravity.

10. In a device of the character described adapted for use in connection with a resiliently supported mass to be tested, means for resiliently supporting the same, means for rotating a weight around an axis of said mass to cause vibrations thereof, and means for recording said vibrations, and the speed of rotation of said weight.

11. In a device of the character described adapted for use in connection with a resiliently supported mass to be tested, means for resiliently supporting the same, means for rotating a weight around an axis of said mass to cause vibrations thereof, at variable speeds, and means for measuring the speed of rotation of said weight and the extent of vibration caused thereby.

12. In a device of the character described adapted for use in connection with a resiliently supported mass to be tested, means for resiliently supporting the same, means for rotating a weight around an axis of said mass to cause vibrations thereof, and means for obtaining a jointly readable record of said vibrations and of the speed of rotation of said weight.

13. In a device of the character described adapted for use in connection with a resiliently supported mass to be tested, means for resiliently supporting the same, means for rotating a weight around an axis of said mass to cause vibrations, thereof, and means for recording said vibrations.

14. In a device of the character described adapted for use in connection with a mass, means resiliently supporting said mass for vertical vibration, a weight mounted for rotation about an axis of said mass, and means for indicating the vibrations of said mass.

15. The method of balancing a mass which comprises rotating a second mass about an axis of the first mentioned mass, turning the latter to different positions about said axis, obtaining a record of the vibrations of said axis for each of said different positions of said first mentioned mass, and changing the distribution of weight of said mass.

16. The method of balancing a mass which comprises rotating a second mass about an axis of the first mentioned mass, turning the latter to different positions obtaining a record of the vibrations of said axis for each of said different positions, turning the mass end for end, obtaining a record of vibrations of the first mentioned mass when turned end for end, and changing the distribution, weight of said mass.

17. The method of balancing a mass which comprises rotating a second mass about an axis of the first mentioned mass, obtaining a record of the vibrations of said first mentioned mass, and changing the distribution weight of said first mentioned mass until the vibrations thereof do not vary when the latter is moved to different positions.

18. In a device of the character described adapted for use in connection with a mass having supporting extensions projecting therefrom, means cooperating with said extensions for supporting said mass for oscillation, a weight adapted to be mounted for rotation upon one of said extensions, and means for rotating said weight relative to said mass.

19. In a device of the character described adapted for use in connection with a mass having supporting extensions projecting therefrom, means cooperating with said extension for supporting said mass for oscillation, a weight adapted to be mounted for rotation on one of said extensions, means for rotating said weight, and means for recording the vibrations of said mass.

20. In a device of the character described adapted for use in connection with a mass having extensions projecting therefrom, supporting means cooperating with one of said extensions, resilient supporting means cooperating with the other extension, a weight adapted to be mounted for rotation on one of said extensions, and means for rotating said weight at variable speeds.

In testimony whereof I have affixed my signature.

ELMER A. SPERRY.